US008654214B2

(12) United States Patent
Benezra et al.

(10) Patent No.: US 8,654,214 B2
(45) Date of Patent: Feb. 18, 2014

(54) MULTI-SPECTRAL IMAGING

(75) Inventors: Moshe Benezra, Beijing (CN); Chi Cui, College Park, MD (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/426,053

(22) Filed: Mar. 21, 2012

(65) Prior Publication Data

US 2012/0218463 A1 Aug. 30, 2012

Related U.S. Application Data

(62) Division of application No. 12/135,214, filed on Jun. 9, 2008, now Pat. No. 8,253,824.

(60) Provisional application No. 60/998,731, filed on Oct. 12, 2007.

(51) Int. Cl.
*H04N 9/68* (2006.01)
*H04N 5/222* (2006.01)
*H04N 5/225* (2006.01)

(52) U.S. Cl.
USPC .......................... 348/234; 348/370; 348/360

(58) Field of Classification Search
None
See application file for complete search history.

(56) References Cited

U.S. PATENT DOCUMENTS

| 4,253,447 | A | * | 3/1981 | Moore et al. | 600/109 |
| 4,485,336 | A | * | 11/1984 | Yoshiyama et al. | 315/241 P |
| 4,710,012 | A | * | 12/1987 | Yamada | 396/157 |
| 5,019,845 | A | * | 5/1991 | Asakura et al. | 396/175 |
| 6,081,076 | A | * | 6/2000 | Ogawa | 315/241 P |
| 7,423,658 | B1 | * | 9/2008 | Uomori et al. | 345/660 |
| 2002/0099295 | A1 | * | 7/2002 | Gil et al. | 600/476 |
| 2005/0046739 | A1 | * | 3/2005 | Voss et al. | 348/371 |
| 2006/0103738 | A1 | * | 5/2006 | Sano | 348/222.1 |
| 2007/0047946 | A1 | * | 3/2007 | Helbing et al. | 396/182 |
| 2007/0085926 | A1 | * | 4/2007 | Yuyama et al. | 348/370 |

* cited by examiner

*Primary Examiner* — Luong T Nguyen
(74) *Attorney, Agent, or Firm* — Carole Boelitz; Micky Minhas

(57) ABSTRACT

Multi-spectral imaging technique embodiments are presented which involve an active imaging approach that uses wide band illumination of known spectral distributions to obtain multi-spectral reflectance information in the presence of unknown ambient illumination. In general, a reflectance spectral distribution of a captured scene is computed by selecting a number of different illumination spectra and capturing multiple images of the scene. Each of these images is captured when the scene is illuminated by a different one of the selected illumination spectra in addition to the ambient light. The reflectance spectral distribution of the scene is computed for each pixel location based on the relative response between pairs of the radiometric responses of the corresponding pixels in the captured images, given a set of parameters including the added illumination spectra used to capture each of the images and the response function and spectral sensitivity of the camera used to capture the images.

19 Claims, 6 Drawing Sheets

MULTI-SPECTRAL IMAGING

CROSS REFERENCE TO RELATED APPLICATION

This application is a divisional of a prior application entitled "MULTI-SPECTRAL IMAGING", which was assigned Ser. No. 12/135,214 and filed Jun. 9, 2008, and which claimed the benefit of and priority to provisional U.S. patent application Ser. No. 60/998,731, filed Oct. 12, 2007.

BACKGROUND

Multi-spectral imaging is an extremely wide field of research ranging from material classification and color measurement to terrestrial imaging and astronomical imaging. Of particular interest has been the aspects of multi-spectral imaging that are related to computer vision and image based rendering.

SUMMARY

Multi-spectral imaging technique embodiments described herein generally involve an active imaging approach that uses wide band illumination of known spectral distributions to obtain multi-spectral reflectance information in the presence of unknown ambient illumination. The multi-spectral reflectance information can be employed to synthesize color images of the captured scene under arbitrary illumination and arbitrary camera response characteristics, among other uses.

In one general embodiment, this multi-spectral imaging involves computing a reflectance spectral distribution of a captured scene by selecting a prescribed number of different illumination spectra and capturing multiple images of the scene. Each of these images is captured when the scene is illuminated by a different one of the selected illumination spectra in addition to the ambient light. The reflectance spectral distribution of the scene is computed for each pixel location based on the relative response between pairs of the radiometric responses of the corresponding pixels in the captured images, given a set of parameters including the added illumination spectra used to capture each of the images and the response function and spectral sensitivity of the camera used to capture the images.

In one implementation of the foregoing multi-spectral imaging, the images of the scene are captured using a digital camera and a wide band illumination source. This wide band illumination source can take the form of an illumination source with a known spectral distribution and a series of filters with known spectral transmittance distributions. A different one of the filters is positioned in front of the illumination source each time an image of the scene is captured. This creates a desired wide band illumination with different spectral distributions for each image.

It should also be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

DETAILED DESCRIPTION

In the following description of multi-spectral imaging technique embodiments reference is made to the accompanying drawings which form a part hereof, and in which are shown, by way of illustration, specific embodiments in which the technique may be practiced. It is understood that other embodiments may be utilized and structural changes may be made without departing from the scope of the technique.

1.0 Multi-Spectral Imaging System

Figure 1:
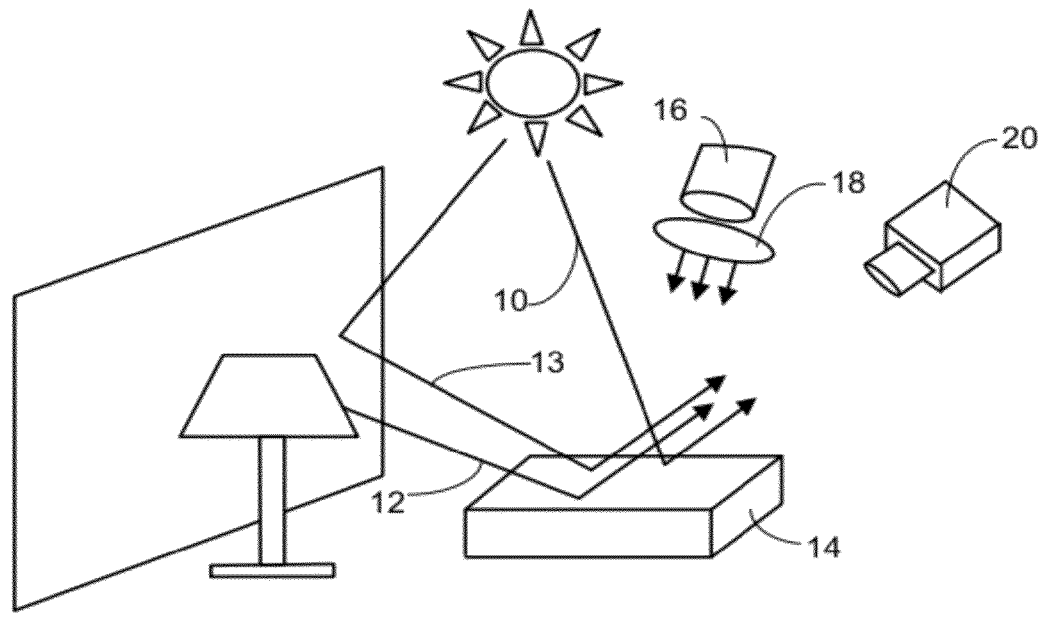
FIG. 1 is a simplified system for capturing images for multi-spectral imaging.

Before multi-spectral imaging technique embodiments are described, a description of a suitable system for capturing the images for the multi-spectral imaging will be presented. In general, a system for capturing the images for the multi-spectral imaging technique embodiments described herein includes a digital camera and a wide band illumination source. For example, in the idealized indoor scene shown in FIG. 1, the ambient illumination includes sunlight 10, light from a floor lamp 12, and light reflected 13 from the wall—all of which shine on an object 14. A wide band illumination source is placed so as to also shine on the object 14 and camera 20 is situated so as to capture an image of the object 14. In one embodiment, the wide band illumination source includes an illumination source 16 with a known spectral distribution and filters 18 with known spectral transmittance distributions. The filters 18 are positioned in front of the illumination source 16 one at a time to create the desired wide band illumination with different spectral distributions. In another embodiment, the wide band illumination source is a set of Light Emitting Diodes (LEDs), each with a different spectral distribution.

In the embodiment where filtered wide band illumination is employed, a scene is captured by the camera multiple times—each time using a different filter. The resulting images are then used to compute multi-spectral reflectance information on a per-pixel basis as will be described in the next section. Multi-spectral reflectance information can be used to synthesize color images of the captured scene under arbitrary illumination (which is sometimes referred to as spectral-relighting of a scene) and arbitrary camera or film response characteristics. Additionally, this information can be used, for example, in computer vision, industrial applications (color of products), and medical imaging. Still further, this information can be used to synthesize white balanced images of the captured scene. These abilities can be used in many applications, such as recording and archiving for cultural e-Heritage and digital museums.

In addition, the use of a filtered wide band illumination scheme means only a few simple and very affordable filters are needed to obtain the desired multi-spectral reflectance information. As such, embodiments to be described herein can be employed in professional studio photography, as well as amateur photography. Professional studios already have multiple light sources (strobe and continuous), and some even have computerized illumination systems. It is therefore very simple to add a few filters and obtain much richer post-processing capabilities.

2.0 Multi-Spectral Imaging Technique Embodiments

General embodiments of a system for capturing images using wide band illumination having been described above, a description of multi-spectral imaging technique embodiments used to compute a reflectance spectral distribution of the scene depicted in the images will now be provided.

Figure 2:
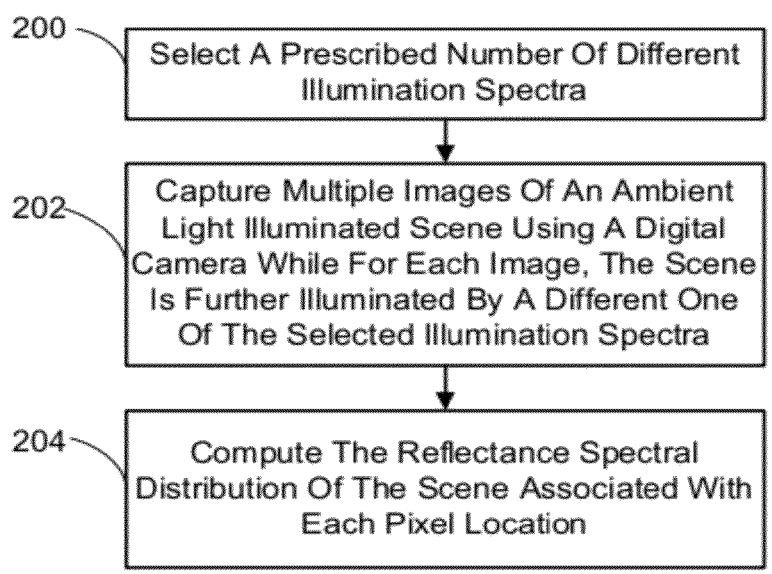
FIG. 2 is a flow diagram generally outlining one embodiment of a process for computing the reflectance spectral distribution of the scene.

Referring to FIG. 2, a generalized embodiment for computing the aforementioned reflectance spectral distribution of the scene is outlined. This embodiment first involves selecting a prescribed number of different illumination spectra (200). As stated previously, in one embodiment this involved employing an illumination source of a known spectral distribution and selecting a prescribed number of filters having known spectral transmittance distributions. Next, multiple images of a scene illuminated by ambient light are captured using a digital camera where each image is captured when the scene is further illuminated by a different one of the selected illumination spectra (202). In one embodiment, this entailed placing a different one of the selected filters in front of the light source when each respective image was captured. For each pixel location, the reflectance spectral distribution of the scene associated with that pixel location is then computed (204). In general, this is based on the relative response between pairs of the radiometric responses of the corresponding pixels in the captured images associated with the pixel location under consideration, given a set of parameters including the added illumination spectra used to capture each of the images and the response function and spectral sensitivity of the camera used to capture the images.

The following sections provide a more detailed description of the multi-spectral imaging technique embodiments.

2.1 Image Modeling

A radiometric response of a pixel (x, y) in an image can be modeled as:

$$\rho_k^{xy} = t \int R_k(\lambda) S^{xy}(\lambda) E^{xy}(\lambda) d(\lambda) + N(\alpha t, \alpha t), \quad (1)$$

where $E^{xy}(\lambda)$ is the spectral distribution of the incident flux (irradiance) at the world point corresponding to pixel (x, y), $S^{xy}(\lambda)$ is the reflectance spectral distribution at this world point, $R_k(\lambda)$ is the camera response function at channel k, and t is the integration time. The parameter $N(\alpha t, \alpha t)$ is additive Gaussian noise with mean and variance proportional to the integration time. This approximates a sensor's Poisson distributed additive noise (mostly dark current).

As described previously, a light source with known spectral distribution $L(\lambda)$ and a filter i with known spectral transmittance distribution $\Phi_i(\lambda)$ are employed to further illuminate the scene. The filter is put in front of the illumination source.

Assuming that no shadows are cast by the illumination source, the irradiance $E^{xy}(\lambda)$ at the world point P is composed of two components: ambient illumination $A^{xy}(\lambda)$, and the additive light $L(\lambda)$ modulated by $\Phi_i(\lambda)$. Assuming the added component is unaffected by location of P, adding it to the model yields:

$$\rho_{k,i}^{xy} = t_i \int R_k(\lambda) S^{xy}(\lambda) [A^{xy}(\lambda) + \Phi_i(\lambda) L(\lambda)] d(\lambda) + (\alpha t, \alpha t), \quad (2)$$

where $t_i$ is the integration time used with filter i.

Subtracting two measurements taken with two different filters i,j and normalized by the (possibly different) integration times $t_i$, $t_j$ gives:

$$t_j \rho_{k,i}^{xy} - t_i \rho_{k,j}^{xy} \approx t_j t_i \int R_k(\lambda) S^{xy}(\lambda) \Phi_i(\lambda) L(\lambda) d(\lambda) - \\ t_i t_j \int R_k(\lambda) S^{xy}(\lambda) \Phi_j(\lambda) L(\lambda) d(\lambda) + N(0, 2\alpha t_i t_j). \quad (3)$$

This eliminates any linear effect caused by the ambient light component, which can be quite complex, and reduces the mean of the additive noise. The cancellation of the (linear) ambient light component would not be possible had the filter been placed in front of the sensor, as the unknown ambient illumination component would be affected by the filter as well.

2.2 Filter Selection

Placing the filter in front of the light can however also have an undesirable consequence. The filter attenuates the intensity of the light source, but does not affect the intensity of the ambient light. Using wideband filters reduces the attenuating effect. However, finding a sufficient number of significantly different wideband filters is not an easy task. Luckily, since the filters are placed in front of the light source, they need not have optical quality surfaces. In exemplary tested embodiments, Roscolux theatrical filters manufactured by Rosco International were employed. These filters are designed for lighting applications in theaters and are available with over 230 different (known) spectral transmittance distributions. While a large number of filters are available, a smaller number (e.g., 2-16) are able to provide the desired multi-spectral reflectance information with acceptable accuracy for a wide variety of applications. In one embodiment, the smaller group is simply randomly selected from the available filters. In other embodiments, an appropriate filter selection method is adopted to choose the filters. Typically, these methods (such as trichromatic filter selection optimization methods) involve maximizing light transmittance efficiency and matching the human eye response. However, in exemplary tested embodiments, a filter selection optimization technique was employed that attempts to select a group of filters that produces numerical stability in the complete system, including the light source, filter set and camera response.

This numerical stability is accomplished by seeking to minimize the condition number of M in the resulting discrete version S=MX, where S is the recovered reflectance, $M = M_{n \times n} = [R_\lambda(\Phi_\lambda^i - \Phi_\lambda^j) L_\lambda]^{-1}$, $1 \le i \le n$, $j=i+1$ is the transformation matrix, n is the number of spectral channels, and X is the measurement vector $\rho_i^{xy} - \rho_j^{xy}$, of Eq. (3) (scale omitted for clarity). It is noted that in exemplary tested embodiments, $M^{-1}$ was used to avoid matrix inversion. More particularly, minimization of the following ranking expression is sought:

$$k(M) + \omega \bar{T}^{-1}, \quad (4)$$

where k(M) is the condition number of M, T is the average transmittance of the selected filter set and is used to favor better transmittance, and ω is a small weighting factor (e.g., 0.1 or less).

In the foregoing example where there were more than 230 filters available to choose from and up to 16 filters were to be chosen, it is clear that the number of combinations $$\binom{230+}{16}$$

is too large to be directly evaluated using an exhaustive search. This is a difficult nonlinear optimization problem. However, because a selection can be represented as a string of zeros and ones, or in a more compact way, as a string of indices, selection problems lend themselves naturally to optimization using genetic methods. The "DNA" represents a specific selection of filters, a crossover is a switching of filter subsets between two selections, and a mutation is the substitution of a single filter with another. While any suitable genetic algorithm could be employed, in exemplary tested embodiments the following technique was used to select the filters.

Figure 3A:
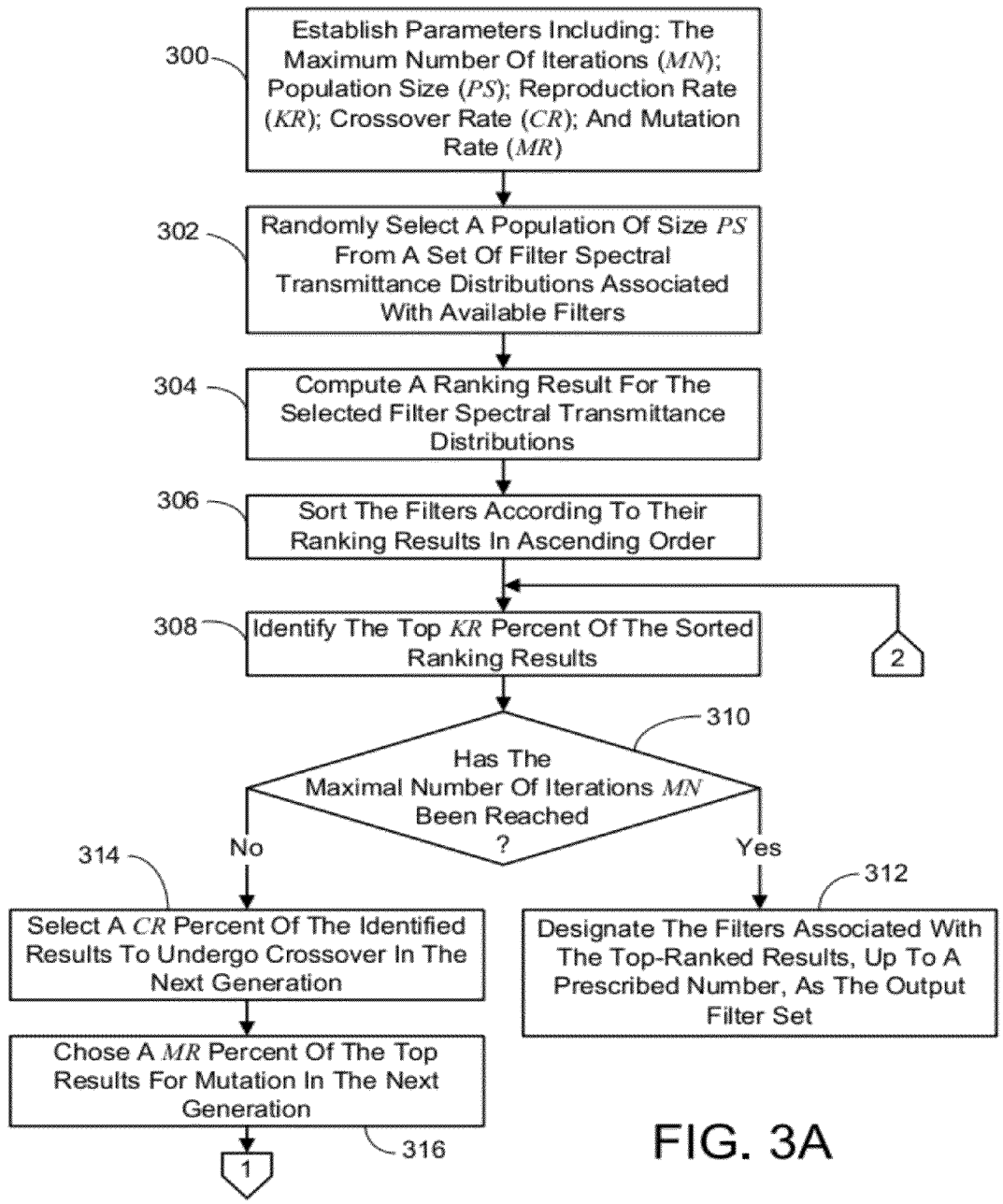
FIGS. 3A-B show a continuing flow diagram generally outlining a process for selecting optical filters for multi-spectral imaging using a "genetic algorithm".
Figure 3B:
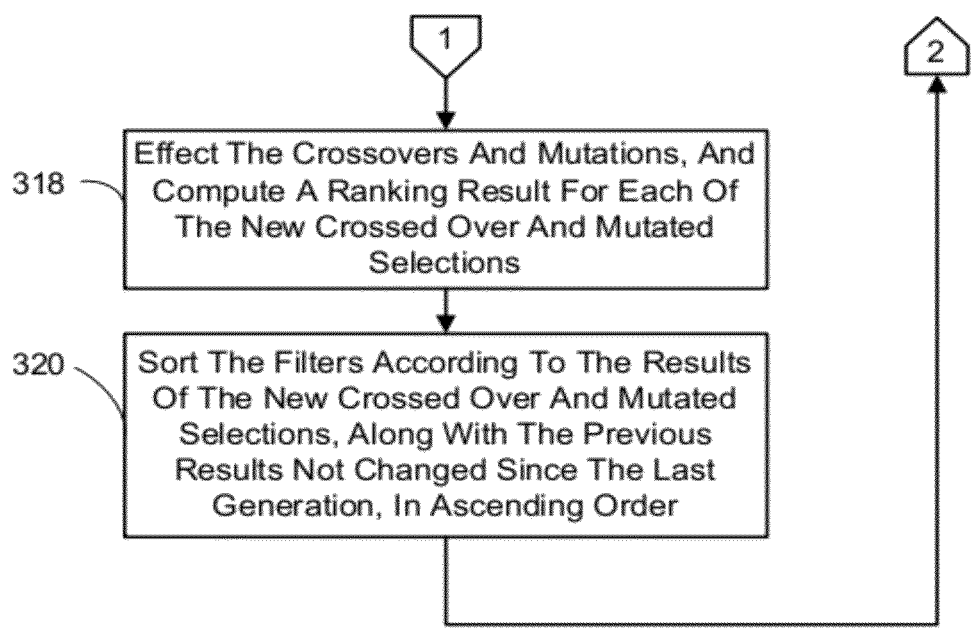

First, referring to FIGS. 3A-B, several parameters are established (300). These parameters include:
 MN—maximum number of iterations;
 PS—population size;
 KR—reproduction (keep) rate;
 CR—crossover rate; and
 MR—mutation rate.

Given the foregoing parameters, the filter selection technique used in exemplary tested embodiments involves first selecting at random a population of size PS from a set of filter spectral transmittances Φ associated with the available filters (302). For example, a population of size 500 can be chosen from the aforementioned 230+ filters having known spectral transmittance distributions. Next, given the spectral distribution L of the illumination source and the response function R of the camera that is to be used to capture images, Eq. (4) is computed for the previously selected filter spectral transmittance distributions to produce ranking results (304). The filters are then sorted according to their ranking result in ascending order, such that the minimum values come first followed by the larger values (306). The top KR percent of the sorted results are identified (308), and it is determined if the maximal number of iterations MN has been reached (310). It is noted that in this embodiment where the rank is tied to the condition number, the top percent corresponds to the ranking results with the lower values. However, if other ranking methods are employed, this might not be the case. For example, depending on the ranking procedure, the top percent might correspond to the greater values. If MN has been reached, then the filters associated with the top-ranked results, up to the number of filters that are to be used in capturing images of the scene, are designated as the output filter set (312) and the process ends. Otherwise, a CR percent of the top ranking results are selected to undergo crossover (314) in the next generation (i.e., iteration). The selection is based on fitness in that the results selected are taken from those having the higher values. In addition, a MR percent of the top results are chosen for mutation (316) in the next generation. These can be chosen from all the top ranked results or just those not selected for crossover. Here again, the selection is based on fitness in that the results selected are taken from those having the higher values. The foregoing embodiment for filter selection then continues by effecting the aforementioned crossovers and mutations, and computing Eq. (4) for the new crossed over and mutated selections (318). The results of the foregoing computations, along with the previous ranking results not changed since the last generation, are used to sort the filters in ascending order (320). Actions 308 through 320 are then repeated, as appropriate, until an output filter set is established.

It is noted that a potentially different set of filters would ultimately be selected by the foregoing filter selection technique embodiment if the illumination source was different. For example, the illumination source could be xenon-based as is found in a typical electronic flash for a camera. The illumination source could also be tungsten-based as is found in incandescent type lamps. A potentially different set of filters could also be selected by the foregoing filter selection technique embodiment if a camera with a different response function is employed. Further, in the case of a tungsten illumination source it was found that adding a corrective blue filter to boost its color temperature produced lower condition numbers in the filter selection process. This indicates that the "corrected" tungsten illumination may produce more accurate results than tungsten illumination alone. In exemplary tested embodiments, when a corrected tungsten illumination source was employed, the corrective blue filter was a ¼ blue filter, and was used in conjunction with each of the other filters when capturing images.

2.3 Computing the Reflectance Spectral Distribution

Once the desired number of filters has been selected, an image of a subject scene is captured using each of the filters in turn, as will be described shortly. If "corrected" tungsten illumination is used, the aforementioned corrective filter is employed to capture each image as well.

Figure 4:
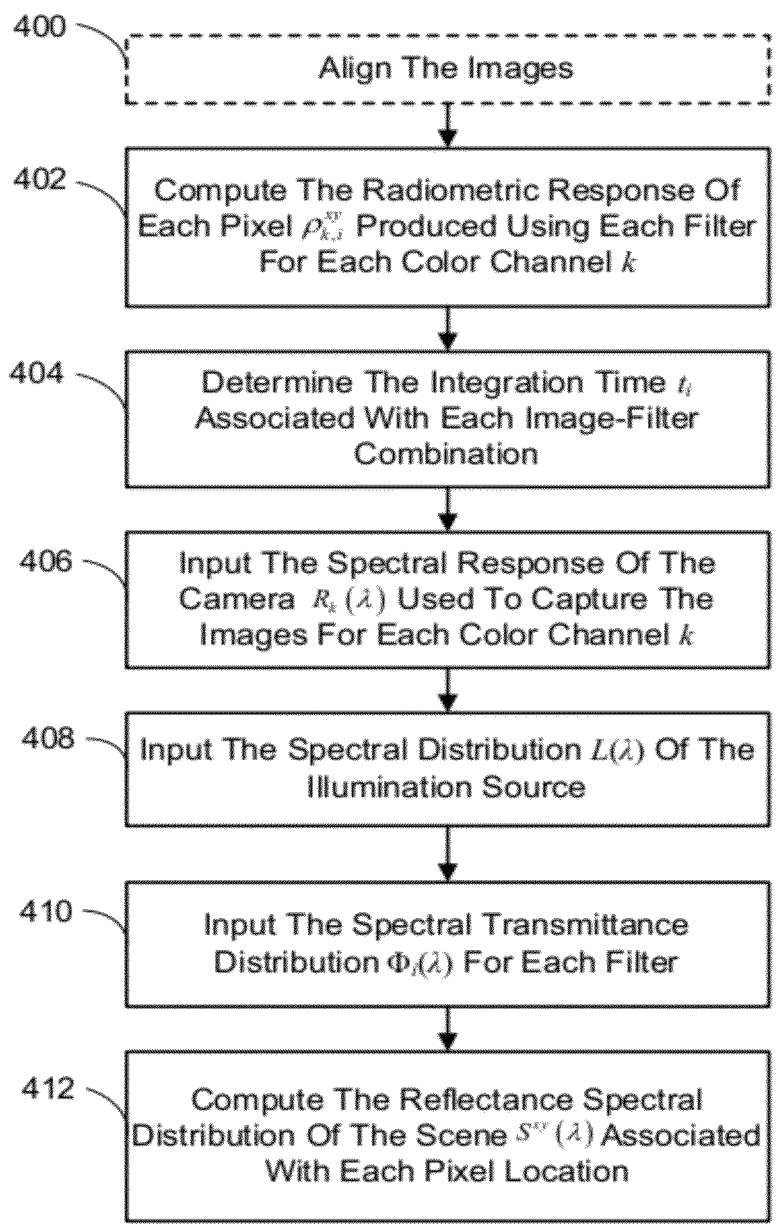
FIG. 4 is a flow diagram generally outlining one implementation of a part of the process of FIG. 2 for computing per-pixel reflectance spectral distributions.

The images are then used to compute per-pixel reflectance spectral distributions using Eq. (3). More particularly, referring to FIG. 4, the images may need to be aligned first before proceeding (400). The images will have been captured over a period of time. While the images can be captured in quick succession, there may still be some movement of the camera, movement in the scene, or both. Any appropriate image alignment method can be used to identify the corresponding pixels in each of the images. The optional nature of this first action is indicated in FIG. 4 by the broken line box.

The reflectance spectral distribution of the scene $S^{xy}(\lambda)$ associated with a pixel location x,y is then computed using the pixel data of the corresponding pixels in the captured images. To accomplish this task, the radiometric response of each pixel $\rho_{k,i}^{xy}$ produced using each filter is computed for each color channel k (assuming color images) (402). Next, the integration time $t_i$ associated with each image-filter combination (which might be different between images) is determined (404). This integration time corresponds to the exposure time of the image. The foregoing information is extracted from the images in any appropriate manner. In addition, the spectral response of the camera $R_k(\lambda)$ used to capture the images is input for each color channel k (406). This information is readily available from the camera's manufacturer, as well as other sources. The spectral distribution $L(\lambda)$ of the illumination source is also input (408). This information is also readily available for most typical sources. Further, the spectral transmittance distribution $\Phi_i(\lambda)$ for each filter is input (410). As indicated previously, this information is available from the filter manufacturer as well as other sources.

Given the foregoing information, the reflectance spectral distribution of the scene $S^{xy}(\lambda)$ associated with each pixel location is computed using the pixel values associated with the pixels in each of the captured images located at the corresponding pixel location under consideration (412). More particularly, Eq. (3) is used to establish a system of linear equations for each pixel using all channels, where each equation is formed using the aforementioned parameters associated with a different pair of filters. The systems of equations are then solved for the reflectance spectral distribution of each pixel under consideration using any appropriate method: such as singular value decomposition (SVD); pseudo inverse; and the like. In exemplary tested embodiments, a truncated SVD approach was employed.

The result of the foregoing computations is a reflectance spectral distribution for each pixel location on a per channel basis. This information is captured and can be used to synthesize a white balanced image under unknown ambient illumination, or to synthesize color images of the captured scene under arbitrary illumination (which is sometimes referred to as spectral-relighting of a scene) and arbitrary camera or film response characteristics. These synthesizing actions will be described in more detail later.

2.4 Computing Environment

The foregoing computations associated with filter selection, image alignment, computing the reflectance spectral distribution, among other actions, may be implemented using any of numerous general purpose or special purpose computing system environments or configurations. As such, a brief, general description of a suitable computing environment will now be described.

Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 5:
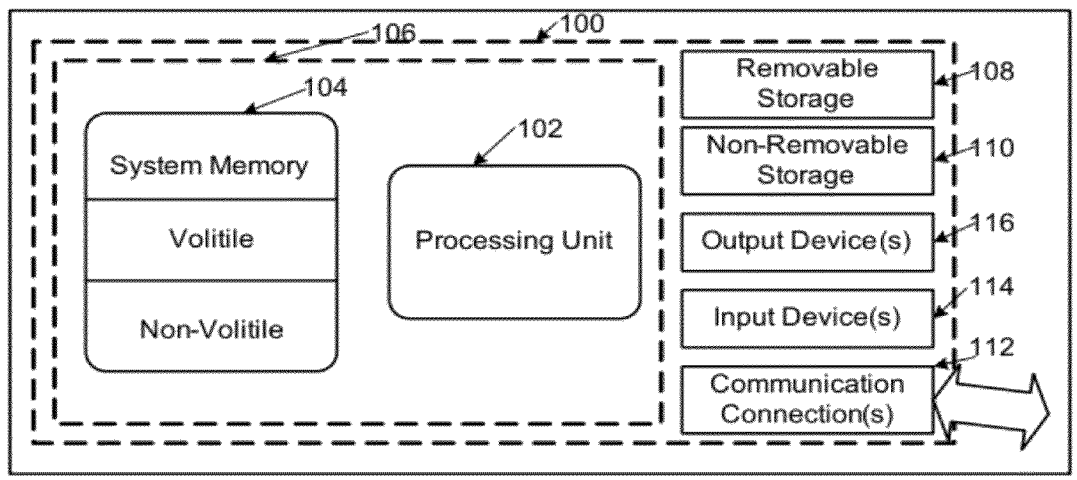
FIG. 5 is a diagram depicting a general purpose computing device constituting an exemplary system for implementing multi-spectral imaging technique embodiments described herein.

FIG. 5 illustrates an example of a suitable computing system environment. The computing system environment is only one example of a suitable computing environment and is not intended to suggest any limitation as to the scope of use or functionality of embodiments described herein. Neither should the computing environment be interpreted as having any dependency or requirement relating to any one or combination of components illustrated in the exemplary operating environment. With reference to FIG. 5, an exemplary system for implementing the embodiments described herein includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 5 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 5 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Device 100 may also have input device(s) 114 such as keyboard, mouse, pen, voice input device, touch input device, camera, etc. Output device(s) 116 such as a display, speakers, printer, etc. may also be included. All these devices are well know in the art and need not be discussed at length here.

The embodiments described herein may be described in the general context of computer-executable instructions, such as program modules, being executed by a computing device. Generally, program modules include routines, programs, objects, components, data structures, etc. that perform particular tasks or implement particular abstract data types. The embodiments described herein may also be practiced in distributed computing environments where tasks are performed by remote processing devices that are linked through a communications network. In a distributed computing environment, program modules may be located in both local and remote computer storage media including memory storage devices.

For the multi-spectral imaging technique embodiment described herein, the aforementioned computing device can be a part of the camera used to capture images of a scene, or can be a separate external computing device that uses the images captured by the camera as input.

3.0 Image Capture Systems for Multi-Spectral Imaging

As described previously, an embodiment of the architecture for capturing the images for the above-described multi-spectral imaging technique embodiments includes a digital camera, an illumination source, and multiple filters.

In one implementation, a 35 mm slide projector is employed. The lamp of the projector is the illumination source. A set of filters is selected and each placed in a projector cartridge mechanism. In addition, in this implementation the projector lamp is a tungsten-based illumination source. As such, a correction filter as described previously is employed by placing it in front of the projector lens. A digital camera is used to capture a sequence of images, each with a different one of the filters placed between the illumination source and the backside of the lens of the projector via the use of the projector's cartridge mechanism. A digital projector (with possibly non-RGB filters) can also be used, but has more limited spectral range.

Figure 6:
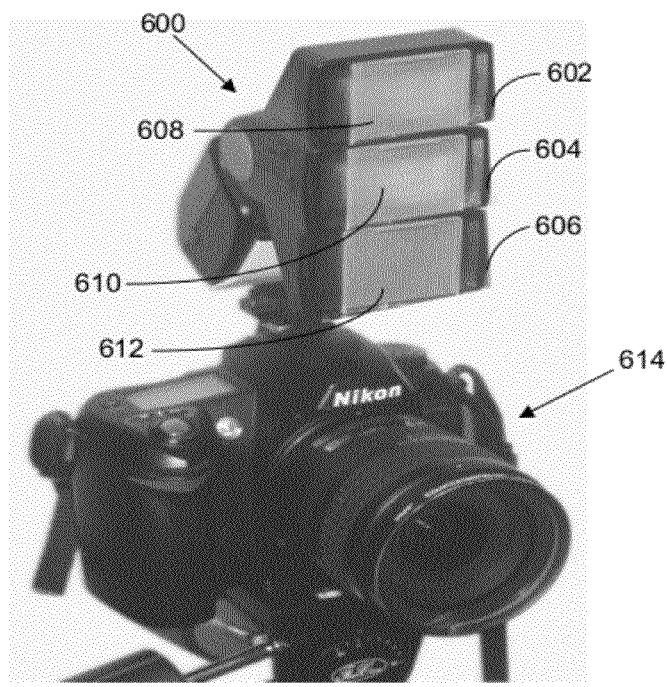
FIG. 6 is an image capture system featuring an illumination source in the form of a multi-stage electronic camera flash unit.

In another implementation of an image capture system, an illumination source in the form of a multi-stage electronic camera flash unit is utilized. In this embodiment, a number of filters are selected and a different one is placed in front of each stage of the flash unit. The flash unit can be a separate device located external to the camera being used to capture images, or it can be integral to the camera itself. For example, in the implementation shown in FIG. 6, the flash unit 600 is a separate device that has three vertically-stacked Xenon-based flash elements 602, 604, 606. Three filters 608, 610, 612 were selected and a different one of the filters was positioned in front of each of the flash elements 602, 604, 606. The flash unit 600 is secured to the top of a digital camera 614, which has a continuous shooting mode that can be set to capture three images in quick succession. Either the camera 614 of the flash unit 600 causes a different one of the flash elements 602, 604, 606 to flash when each image is captured. This embodiment allows for portability. As such it would be particularly useful to a professional photographer in the field or to an amateur photographer, as no studio or fixed equipment is required.

4.0 Synthesizing Images

As stated previously, the captured reflectance spectral distribution information can be used to synthesize color images of the captured scene under arbitrary illumination and arbitrary camera response characteristics, or to synthesize a white balanced image under unknown ambient illumination.

In regard to the synthesis of color images of the captured scene under arbitrary illumination and arbitrary camera response characteristics, the images produced using just three filters is all that is required—although better accuracy is obtained if the images from more filters are employed. For example, in one tested embodiment 16 images produced using 16 different filters were employed to synthesize color images from the captured reflectance spectral distribution information. In general, color images are synthesized by a computing device (such as described in the Computing Environment section) by first inputting user selected illumination type and/or a camera type. For example, a user could select an illumination type representing a tungsten illumination source with the aforementioned corrective filter and some other filter. As long as the spectral distribution of the source (which can be for example the sun, fluorescent light, and so on including filtered light) is accessible (e.g., stored locally or remotely, and selected by the user from a list of available illumination types) or input by the user, the selection is valid. The per channel response function $R_k(\lambda)$ associated with the camera used to capture the images could be used as a default, or the user could specify a different camera response function (or film response function, as some photographers may cherish a certain film with traditional look and feel). Here again, the selected camera response function must be accessible or input by the user. Given these parameters, the per channel radiometric response of each pixel location $\rho_k^{xy}$ in the image being synthesized can be computed using Eq. (1).

The per-channel synthesized radiometric response of each pixel location $\rho_k^{xy}$ is then used to generate the image in the normal manner. At that point the image is rendered and displayed to the user via a display associated with the computing device.

In regard to the synthesis of a white balance image, the images captured using just two filters are all that is needed even under unknown ambient illumination, as only RGB channel information needs to be recovered. In one embodiment, the process for synthesizing a white balance image for the captured reflectance spectral distribution information is accomplished in a manner similar to the above-described color image synthesis, except that the illumination type is an unfiltered flat illumination.

The foregoing embodiment for synthesizing a white balance image does not require any calibration or pre-capture camera mode selection by the photographer. In addition, the synthesis works on a pixel to pixel basis, rather than a global basis. As such, accurate results are obtained even in the presence of uneven, complex illumination (for example a scene is lit through a window and by a table lamp).

Figure 7:
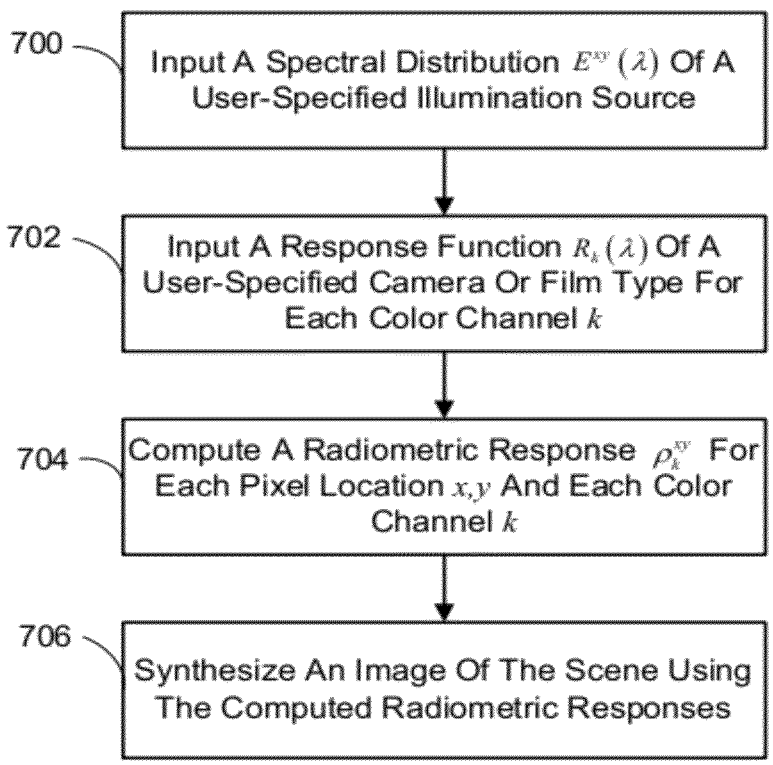
FIG. 7 is a flow diagram generally outlining one embodiment of a process for synthesizing an image of the scene for an arbitrary illumination source and arbitrary camera or film type response function.

Given the foregoing, referring to FIG. 7, in one general embodiment synthesizing an image of the scene for an arbitrary illumination source and arbitrary camera or film type response function involves the following actions. First, a spectral distribution $E^{xy}(\lambda)$ of a user-specified illumination source is input (700), along with a response function $R_k(\lambda)$ of a user-specified camera or film type for each color channel k (702). Then, for each pixel location x,y and each color channel k, a radiometric response $\rho_k^{xy}$ is computed (704). In one implementation this is accomplished using the equation, $\rho_k^{xy} = \int R_k(\lambda) S^{xy}(\lambda) E^{xy}(\lambda) d(\lambda)$. An image of the scene is then synthesized using the computed radiometric responses $\rho_k^{xy}$ (706).

5.0 Additional Embodiments

It is noted that in the foregoing description of multi-spectral imaging technique embodiments, reference is made to the accompanying drawings which form a part hereof, and in which are shown, by way of illustration, specific implementations in which the technique embodiments may be practiced. It is understood that other implementations and further embodiments may be utilized and structural changes may be made without departing from the scope of this disclosure. For example, high spatial frequency illumination can be used to separate the reflection from objects into a direct reflectance component and a global reflectance component. More particularly, the direct and global component for each color filter can be computed, and then the multi-spectral information for the direct and global components can be computed separately in the manner described previously. This multi-spectral information can be used to synthesize the appearance of the direct and global components under white illumination. The synthesized direct and global components can also be blended to get a synthesized normal image under white illumination.

It should also be noted that any or all of the embodiments and implementations mentioned throughout the description may be used in any combination desired to form additional hybrid embodiments.

Wherefore, what is claimed is:

1. A system for capturing images of a scene using wide band illumination with known spectral distributions in the presence of ambient illumination having an unknown spectral distribution, comprising:
    a digital camera; and
    a wide band illumination source in the form of a multi-stage electronic camera flash unit, comprising,
        an illumination source comprising multiple flash elements each producing illumination having the same known spectral distribution, and
        multiple wideband filters each having a different known spectral transmittance distribution, wherein a different one of said multiple wideband filters is disposed in front of each of the multiple flash elements, and wherein the multi-stage electronic camera flash unit is configured so as to, when triggered, cause each of the multiple flash elements to illuminate the scene being captured by the digital camera at a different time.

2. The system of claim 1, wherein the digital camera is in communication with and is capable of triggering the multi-stage electronic camera flash unit, and comprises a continuous shooting mode such that the digital camera triggers the multi-stage electronic camera flash unit to cause each of the multiple flash elements to illuminate a scene at a different time coincident with the digital camera capturing an image of the scene.

3. The system of claim 2, wherein the multi-stage electronic camera flash unit is a separate device located external to the digital camera.

4. The system of claim 2, wherein the multi-stage electronic camera flash unit is integrated into the digital camera.

5. The system of claim 1, wherein the multiple flash elements comprise three vertically-stacked Xenon-based flash elements.

6. A system for capturing images of a scene using wide band illumination with known spectral distributions in the presence of ambient illumination having an unknown spectral distribution, comprising:
   a digital camera; and
   a wide band illumination source in the form of a multi-stage electronic camera flash unit, comprising,
      an illumination source comprising multiple flash elements each producing illumination having the same known spectral distribution, and
      multiple wideband filters each having a different known spectral transmittance distribution, wherein a different one of said multiple wideband filters is positioned in between each of the multiple flash elements and the scene, and wherein the multi-stage electronic camera flash unit is configured so as to, when triggered, cause each of the multiple flash elements to illuminate the scene being captured by the digital camera at a different time.

7. The system of claim 6, wherein the digital camera is in communication with and is capable of triggering the multi-stage electronic camera flash unit, and comprises a continuous shooting mode such that the digital camera triggers the multi-stage electronic camera flash unit to cause each of the multiple flash elements to illuminate a scene at a different time coincident with the digital camera capturing an image of the scene.

8. The system of claim 7, wherein the multi-stage electronic camera flash unit is a separate device located external to the digital camera.

9. The system of claim 7, wherein the multi-stage electronic camera flash unit is integrated into the digital camera.

10. The system of claim 6, wherein the multiple flash elements comprise three vertically-stacked Xenon-based flash elements.

11. A system for capturing images of a scene using wide band illumination with known spectral distributions in the presence of ambient illumination having an unknown spectral distribution, comprising:
   a digital camera; and
   a wide band illumination source comprising,
      an illumination source with a known spectral distribution, and
      multiple wideband filters, each having a known spectral transmittance distribution, wherein a different one of the multiple wideband filters is positioned in front of the illumination source and employed at a different time for each image captured by the digital camera.

12. The system of claim 11, wherein the wide band illumination source is in the form of a multi-stage electronic camera flash unit, comprising:
   multiple flash elements each producing illumination having the same known spectral distribution;
   the multiple wideband filters each having a different known spectral transmittance distribution, wherein a different one of said multiple wideband filters is disposed in front of each of the multiple flash elements; and wherein
   the multi-stage electronic camera flash unit is configured so as to, when triggered, cause each of the multiple flash elements to illuminate the scene being captured by the digital camera at a different time.

13. The system of claim 12, wherein the digital camera is in communication with and is capable of triggering the multi-stage electronic camera flash unit, and comprises a continuous shooting mode such that the digital camera triggers the multi-stage electronic camera flash unit to cause each of the multiple flash elements to illuminate a scene at a different time coincident with the digital camera capturing an image of the scene.

14. The system of claim 13, wherein the multi-stage electronic camera flash unit is a separate device located external to the digital camera.

15. The system of claim 13, wherein the multi-stage electronic camera flash unit is integrated into the digital camera.

16. The system of claim 12, wherein the multiple flash elements comprise three vertically-stacked Xenon-based flash elements.

17. The system of claim 1, wherein the wideband filters are chosen so as to minimize the attenuating effect of the wideband filters on the intensity of illumination source light transmitted therethrough.

18. The system of claim 6, wherein the wideband filters are chosen so as to minimize the attenuating effect of the wideband filters on the intensity of illumination source light transmitted therethrough.

19. The system of claim 11, wherein the wideband filters are chosen so as to minimize the attenuating effect of the wideband filters on the intensity of illumination source light transmitted therethrough.

* * * * *